United States Patent [19]

Kozoe et al.

[11] Patent Number: 4,898,116

[45] Date of Patent: Feb. 6, 1990

[54] POWDER COATING BOOTH

[75] Inventors: Katsutoshi Kozoe, Tokyo; Nobuo Furuya, Yokohama; Shinichi Kimura, Chiba; Yasunari Okamoto, Kawasaki; Mitsuyoshi Kumada, Yachiyo; Tatsuo Sugimoto, Chiba; Takehiko Ueno, Tokyo; Kenjiro Shimizu, Kohnosu; Tsutomu Itoh, Tokyo, all of Japan

[73] Assignee: Onoda Cement Company, Ltd., Onoda, Japan

[21] Appl. No.: 241,343

[22] Filed: Sep. 7, 1988

[30] Foreign Application Priority Data

Sep. 14, 1987 [JP] Japan .................. 62-230499
Jan. 14, 1988 [JP] Japan .................. 63-006263

[51] Int. Cl.⁴ .................. B05C 1/02; B05C 5/00; B05C 13/00
[52] U.S. Cl. .................. 118/621; 118/630; 118/634; 118/308; 118/324; 118/326
[58] Field of Search .................. 118/326, 621, 634, 308, 118/326, 621, 627, 630, 634, 324

[56] References Cited

U.S. PATENT DOCUMENTS

| 2,191,827 | 2/1940 | Benner et al. | 118/634 |
| 3,991,710 | 11/1976 | Gourdine et al. | 118/634 |
| 4,257,345 | 3/1981 | Brice | 118/634 |
| 4,321,281 | 3/1982 | Itoh | 118/621 |
| 4,563,977 | 1/1986 | Spengler | 118/634 |

OTHER PUBLICATIONS

Anon. "Product in Perspective", Design Eng. (G.B.), 1-1979, p. 124, relied on.

Primary Examiner—Willard Hoag
Attorney, Agent, or Firm—Price, Heneveld, Cooper, DeWitt & Litton

[57] ABSTRACT

A powder coating booth a function of supplying air though its ceiling. Sidewalls of the booth is formed from an insulating material or a semiconductor. A belt conveyor is disposed at the bottom of the booth. An electric field is formed so that it extends from a paint gun to the conveyor belt. The majority of oversprayed powder paint produced during painting becomes attached to the upper surface of a portion of the conveyor belt, is carried, together with this belt portion, to the outside of the booth, and is recovered from the conveyor by a blowing-type of static eliminator, thereby minimizing the mount of oversprayed powder paint mixed in an exhaust of the booth drawn through the sidewall.

12 Claims, 4 Drawing Sheets

POWDER COATING BOOTH

BACKGROUND OF THE INVENTION

This invention relates to improvements in an electrostatic powder coating booth and, more particularly, to a powder coating booth in which the greater part of powder oversprayed during powder coating is collected on an upper surface of a conveyor belt which forms the bottom surface of the booth; oversprayed powder thereby collected is moved to a position isolated from the bottom of the booth while being kept on the conveyor belt; and the oversprayed powder paint is recovered by a paint recovering device at this position, these improvements increasing the efficiency with which powder paint is used and making it possible for the coating color to be changed rapidly.

Electrostatic powder coating is highly advantageous in terms of coating film performance, prevention of environmental pollution, saving of resources and so forth. Recently, the importance of electrostatic powder coating has been recognized more and more widely. In a conventional electrostatic powder coating process, part of the electrified powder paint ejected from a painting gun does not attach itself to the object to be coated, and the majority of this part of the paint, namely, the oversprayed powder is drawn together with booth exhaust air and is separated and recovered by an exhaust dust collector of a large size. The remaining part of the oversprayed powder attaches to and accumulates on the bottom and the sidewall surfaces of the booth.

In another known system, the bottom surface of the booth is formed by a gas-permeable conveyor belt in order to exhaust air through the conveyor, and oversprayed powder which collects on the surface of the conveyor belt facing the interior of the booth is carried to one end of the conveyor where it is retrieved.

In the type of powder coating booth that is based on the conventional technique which utilizes a booth exhaust dust collector to retrieve oversprayed paint, the size of the booth exhaust dust collector is large and electrified paint powder becomes attached to internal portions of the collector. It is therefore necessary to clean the exhaust dust collector in order to avoid mixing of colors when the paint color is changed, and this cleaning is very much time consuming. This in turn leads to a lengthening of the time during which the coating line work is suspended.

To cope with this problem, in one known method, a plurality of dust collectors are provided for different colors and are changed over during the operation of the coating booth. This arrangement requires an increased investment on equipment, makes the plant layout difficult because the area occupied by the dust collectors for the respective colors is excessively large, and also entails various problems of operational management.

In another method proposed to solve the above-described problem, an auxiliary dust collector is provided separately from the main dust collector for the purpose of facilitating the color changing operation in such a manner that, while one of these collectors is operating, the other is cleaned, and they are changed over during the color changing operation so as to reduce the time during which operations are suspended. In this case, however, the time taken to clean the collector becomes excessively long if the amount of exhaust from the booth is large. Further more, it is difficult to adopt this method in a case where the color-changing frequency is high, even if the capacity of the booth is small.

It is also necessary to clean the inner surfaces of the booth at the time of a color-change, by removing the paint powder that has become attached thereto. This operation is also very time consuming and again reduces the time available for effective operation. There is also a possibility that a quantity of paint that has become attached and accumulated over a long period of time such as to change in quantity may fall and become mixed with the recovered paint, the resulting coating thus becoming defective. In addition, dropping of attached paint powder may cause generation of a gas-powder mixture and the amount of this gas-powder mixture may temporarily exceed the explosion limit. This poses a serious problem in terms of safety.

In the system of using a gas-permeable conveyor (ordinarily a cloth material) which forms the bottom surface of the booth, the speed at which air is transmitted through the conveyor tends to become excessively high which makes it difficult for fine powder to be readily be retrieved. It is also difficult to completely remove the oversprayed paint that collects on the conveyor. There is therefore a need to change the conveyor at the time of a color change, and the time taken to perform the color changing operation is consequently increased. This system is not practical when applied to a color-change booth.

SUMMARY OF THE INVENTION

It is therefore an object of the present invention to provide a powder coating booth which allows a color changing operation to be performed in a short time in a reliable manner using a small-size low-cost device.

It is another object of the present invention to improve the efficiency of utilization of powder paint as well as the efficiency with which the gun applies paint to an object.

It is still another object of the present invention to provide a powder coating booth which can be operated or maintained at lower cost levels by a reduced number of workers.

To these ends, the present invention provides a powder coating booth having: a sidewall formed from an insulating material or a semiconductor; a ceiling having a function of downwardly supplying air; a bottom opened over a conveyor belt; a means for forming an electric field extending to the conveyor; a suction device for drawing powder paint, the suction device being provided in the sidewall near the bottom of the booth; and a blowing-type static eliminator facing a portion of the conveyor belt positioned at a distance from the bottom of the booth.

In accordance with the present invention, the sidewall of the booth is formed from an insulating material so that it can be charged by ion currents flying from the electrostatic coating gun so as to be maintained at the same potential as that of the gun, thereby preventing oversprayed powder from becoming attached to the sidewall. Even if the powder becomes attached to the sidewall, the force of attaching the powder is reduced. The time taken to clean the interior of the booth at the time of a color change can therefore be reduced. A similar effect can be attained in such a manner that the sidewall of the booth from a high-resistance semiconductor and is connected to a power source so that it is maintained at the same potential as that of the gun. This method is also effective in terms of improvement in the efficiency with which paint supplied from the gun is attached to desired objects. The booth exhausting unit is disposed in the vicinity of the bottom of the booth through which air supplied from the ceiling is discharged so that weak downward air flows are constantly formed in the interior of the booth, thereby preventing over-spray from becoming attached to the ceiling. These flows, together with the means constituted by the grounded conductive belt that forms the bottom of the booth, forcibly make the majority of the oversprayed paint powder attached to the surface of the belt by the synergetic effects in association with the electric field extending from the gun to the belt, or make the majority of the oversprayed paint powder pressed against the surface of the belt by the synergetic effect in association with the electric field extending from the gun to a grounding plate through the belt, thereby reducing the proportion of paint discharged from the booth together with the exhaust. The problem of a considerable reduction in the efficiency of utilization of the paint is thereby eliminated even if a quantity of paint contained in the booth exhaust is wasted. Therefore, there is no need for troublesome color changing operations when a large booth exhaust dust collector is used.

The oversprayed powder paint, that has collected by virtue of the electric field extending to the grounded conductive belt that forms the bottom of the booth, or that has collected by virtue of the electric field extending to the grounding plate superposed on the surface of the insulating belt reverse to the surface thereof that forms the bottom of the booth, is carried from the bottom of the booth to the outside thereof as the insulating belt moves. At this position, the oversprayed powder paint is processed by a blowing type of static eliminator, thereafter being reused. The present invention enables recovery and reuse of oversprayed paint with least proportion of accompanying air by using necessary units of reduced sizes.

BRIEF DESCRIPTION OF THE DRAWINGS

FIG. 2 is a vertical cross-sectional view taken along the line B—B of FIG. 3;

FIG. 3 is a horizontal cross-sectional view taken along the line A—A of FIG. 2;

FIG. 5 is a vertical cross-sectional view taken along the line B—B of FIG. 3; and FIG. 6 is a horizontal cross-sectional view taken along the line A—A of FIG. 2.

DESCRIPTION OF THE PREFERRED EMBODIMENTS

Figure 1:
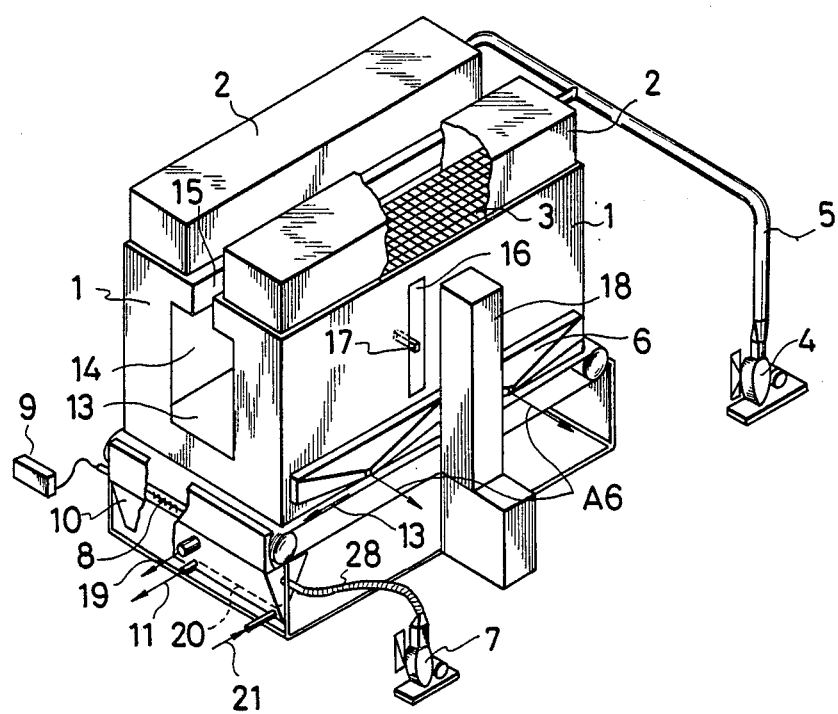
FIG. 1 is a perspective view of the whole body of a powder coating booth which represents an embodiment of the present invention.

Referring to FIG. 1, sidewalls 1 of a powder coating booth in accordance with the present invention are formed from an insulating material such as a plastic resin or a high-resistance semiconductor, and the ceiling of this booth is constructed in such a manner that air which is blown and supplied into air supply boxes 2 through an air supply duct 5 by an air supply fan 4 forms uniform downward flows when it passes through an air supply filter 3 which constitutes the bottom of the air supply box 2.

The bottom of the booth is formed by an electroconductive conveyor belt 13 which is maintained at a desired potential (ordinarily at the ground potential). A suction hood 6 is disposed at a position corresponding to a lower portion of the sidewall 1 of the booth and near the upper surface of the conveyor belt 13, and is used to perform exhaustion of the booth as indicated by the arrow A6. Thus, downward air flows which extend from the ceiling to the lower sides of the sidewalls are continuously formed inside the booth. Therefore, overspray of powder paint ejected from an electrostatic powder gun 17 is continuously transferred to the lower section of the booth and is thereby prevented from attaching itself to ceiling portions, while the electrostatic powder gun 17 which is inserted into the booth through a gun slit 16 formed in one of the sidewalls 1 of the booth and is reciprocatively moved by a reciprocator 18 while blowing electrified powder to objects to be coated (not shown) by the application of a high voltage. The objects are coated with the powder paint by the electrostatic powder gun 17 in an electrostatic paint application manner when they pass through the booth by moving along a hanger slit 15 while being hung on a hanger conveyor (not shown). Since the sidewalls 1 of the booth is formed from an insulating material, they are charged by the electrostatic powder gun 17 during operation so that they are maintained at a high potential of the same polarity as that of the electrostatic powder gun 17. The oversprayed powder paint has also been electrified with the same polarity as that of the sidewalls 1. Therefore, there is substantially no possibility of the oversprayed powder becoming attached to the sidewalls 1. Even if a small quantity of powder becomes attached to the sidewalls, it can be readily be removed in a short time by blowing or scraping during a color changing operation. As a result, in the case of the booth in accordance with the present invention, the time taken to clean the ceiling and the sidewalls at the time of a color change can be markedly reduced.

Figure 2:
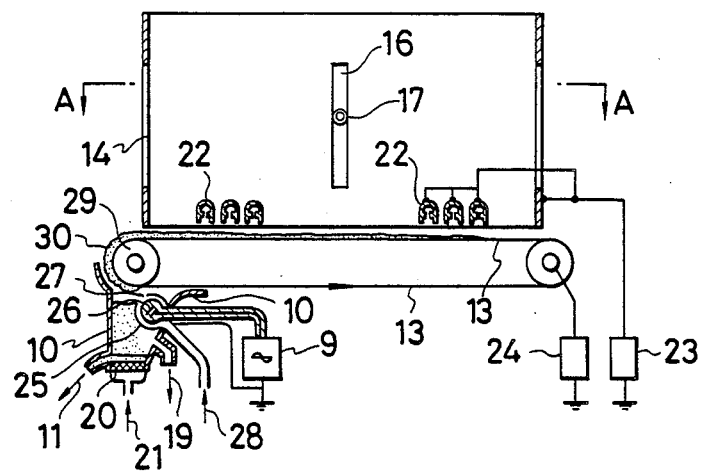
FIGS. 2 and 3 mainly show details of a bottom portion of the booth shown in FIG. 1.

The sidewalls 1 of the booth may be formed from a high-resistance semiconductor and a desired high voltage may be applied to the sidewalls from a power source 23, as shown in FIG. 2, in order to realize the same effects as those attained by the above arrangement using the sidewalls made of an insulating material. In this case, in consideration of safety design, the inner surface of the sidewalls may be formed from a semiconductor while the outer surface of the sidewalls is formed from an insulating material.

The bottom surface of the powder coating booth in accordance with the present invention is maintained at a potential of a polarity opposite to that of the gun by a power source 24, as shown in FIG. 2, or it is grounded. Therefore, almost all of electric fields formed by the electrostatic powder gun 17 extend to the objects to be coated while the rest of them extend to the belt which forms the bottom surface of the booth. It is thereby possible that electrified powder ejected from the electrostatic powder gun 17 becomes attached, with improved efficiency, to the objects to be coated while over-spray is effectively collected by virtue of downward air flows formed in the booth and by the action of the electric fields so that the proportion of oversprayed powder paint contained in the exhaust air is much smaller than that in the case of the ordinary powder coating booth. In consequence, even if a quantity of powder paint retrieved by a booth exhaust dust collector is discharged as waste, the efficiency of utilization of the paint is not considerably reduced. Therefore, there is no need for cleaning when the paint is replaced with a paint having a different color. This is a significant advantage of the present invention.

Static charge on oversprayed electrified powder paint 30 which has collected on the grounded electroconductive belt 13 in the above described manner is removed by a static eliminator 8 which is incorporated in a paint recovering hopper 10 provided by the side of a belt pulley 29. The oversprayed powder thereafter falls onto a porous plate 20 disposed on the bottom of the hopper 10 so that it collects in the form of a fluidized bed and is retrieved as indicated by the arrow 11. The method of gathering the recovered paint is not limited to a method of utilizing the fluidized bed. Instead, it may be a method of utilizing air flows or a small cyclone. A (alternating current) power source 9 for driving the static eliminator 8 by alternately generating large amounts of positive and negative ions is provided. The ions thereby supplied are blown by a blower 7 via an air supply path 28 toward the surface of the belt 13 under the head pulley 29, thereby adequately eliminating static charges on the oversprayed powder paint and making the belt clean enough for a color change each time the belt makes one round. Air for fluidizing paint which is recovered by collecting at the bottom of the hopper is supplied as indicated by the arrow 21. The paint recovering hopper 10 is exhausted as indicated by the arrow 19 in order to prevent supplied air 28 and 21 from jetting outside the hopper 10. The position and direction of this hopper exhaust flow are selected so that the recovered paint can be gathered without containing substantially no air. It is thus possible to minimize the quantity of air contained in the recovered paint 11 and thereby minimize the size of a separation device for removing the air content.

Details of the internal structure of the static eliminator 8 schematically illustrated in FIG. 1 are shown in FIG. 2. Small holes or a slit 27 are formed in a grounded electroconductive duct 25 which is disposed along the belt 13 perpendicularly to the plane of projection of FIG. 2. A multiplicity of electrode needles 26 are also arranged in the direction perpendicular to the plane of projection so that they face the small holes or slit 27. The ac power source 9 applies a high ac voltage to the electrode needles 26 via a protective impedance (capacitor, in the case of the arrangement shown in FIG. 2) so that ac corona discharge takes place from the tips of the needles to the gap 27, thereby alternately generating large amounts of positive and negative ions. These ions are blown to the belt by the air supply as indicated by the arrow 28 so that static electricity on the oversprayed powder paint 30 collected on the belt is removed, thereby enabling the oversprayed paint to be thoroughly separated from the belt and retrieved on the porous plate 20 as a fluidized bed. At the same time, the returning portion of the belt is made clean enough for a color change each time it makes one round. An example of the arrangement in which the bottom surface of the powder coating booth is constituted by a belt is known. However, in this type of arrangement, it is not possible to completely remove fine particles attached by static electricity. Therefore, the performance relating to color changing operation is not adequate, and it is not possible to prevent fixing of paint during of a long-term operation and it is also difficult to prevent occurrence of defects in the coating due to separation of the accumulated paint. In contrast, the oversprayed paint powder recovering unit mainly constituted by the paint recovering hopper 10 and the static eliminator 8 incorporated in the hopper has a simple construction and is small in size and low-cost, and there is therefore no problem if this unit is replaced with a desired number of similar units which may be provided for different colors and each of which is capable of being detachably attached to the booth. This method optimizes the color changing operation in terms of reduction in the color changing time while maintaining a high efficiency of utilization of paint.

Figure 3:
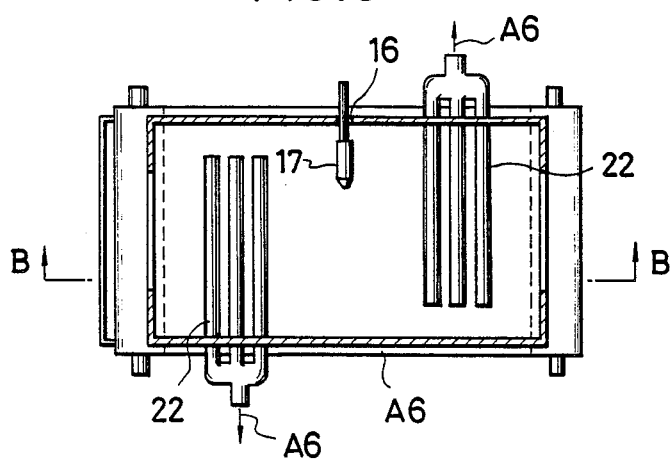

To reduce the rate at which over-spray is mixed with the booth exhaust as well as to prevent over-spray from becoming attached to the sidewalls of the booth by forming downward air flows in the booth, suction of booth exhaust may be effected in such a manner that, as shown in FIGS. 2 and 3, a plurality of ducts 22 each having a narrow supply hole having a downwardly facing opening are disposed close to each other and to the belt 13 and that the ducts 22 are formed from an insulating material or a high-resistance semiconductor so that they can be maintained at a potential of the same polarity as that of the electrostatic powder gun, thereby enabling the efficiency of collection of oversprayed paint powder on the conductive belt 13 to be improved.

The static eliminator used to remove oversprayed electrified powder from the belt is not limited to that adopted for the above-described embodiment and it may be of any other type so long as it is capable of eliminating static charge from electrified powder paint so as to enable this powder paint to be removed from the conductive belt.

The above-described conductive conveyor belt is not necessarily formed from an electroconductive material. Instead of this, a different means for forming an electric field from the electrostatic gun 17 to the belt conveyor can be used. For example, as shown in FIGS. 4 to 6 which show another embodiment of the present invention, the conveyor belt 13 can be formed from an insulating material, a grounding plate 12 being superposed on the inner surface of the conveyor belt at the rear of the upper surface thereof.

Figure 4:
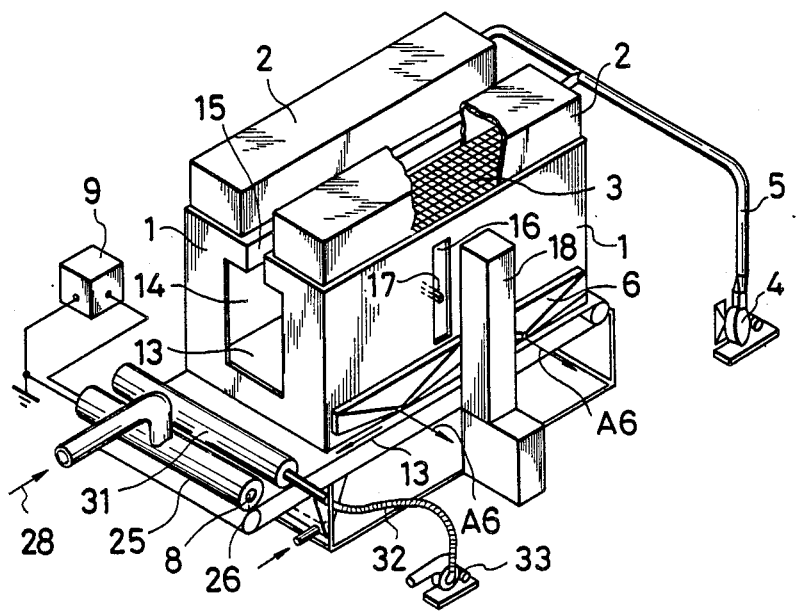
FIG. 4 is a perspective view of the whole body of a powder coating booth which represents another embodiment of the present invention.
Figure 5:
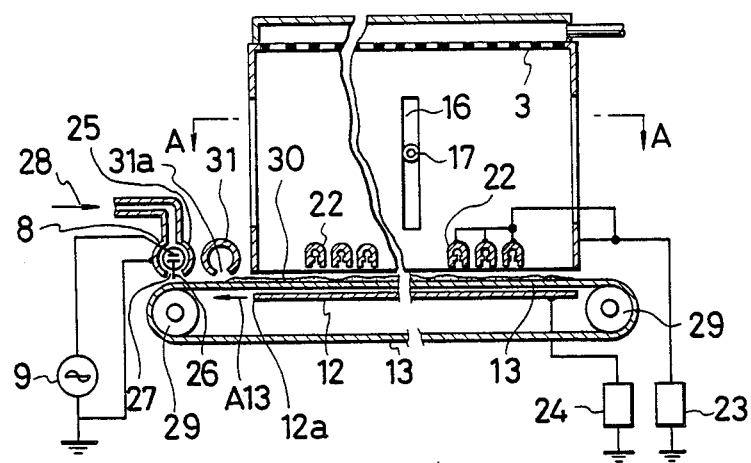
FIGS. 5 and 6 mainly show details of a bottom portion of the booth shown in FIG. 4.
Figure 6:
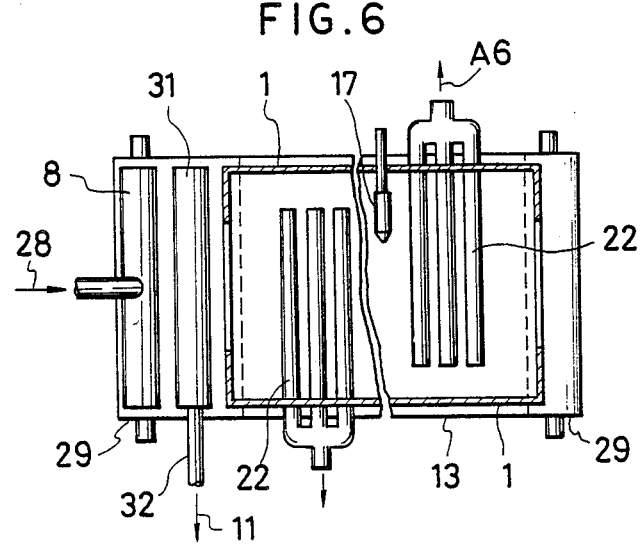

Reference characters in FIGS. 4 to 6 which are the same as those in FIGS. 1 to 3 indicate corresponding components having similar functions.

In the arrangement shown in FIGS. 4 top 6, oversprayed electrified powder paint 30 which has collected on a portion of the insulating belt 13 disposed above the grounding plate 12 is carried from the bottom surface of the booth to the outside as the conveyor belt 13 moves in the direction of the arrow A13. At the same time, the oversprayed paint 30 moves away from an end 12a of the grounding plate 12 disposed below the bottom surface of the booth and, hence, from the electric field extending to the grounding plate so that it loses the force of pressing itself against the upper surface of the conveyor belt 13 and is simply placed thereon. The oversprayed paint is then drawn through a suction inlet 31a of a suction device 31 and is transferred to a paint recovering device (not shown) via a suction duct 32 and a suction blower 33. The method of gathering recovered paint can, of course, be a method of utilizing air flows or a small cyclone instead of fluidized bed. A (alternating current) power source 9 for driving the static eliminator 8 by alternately generating large amounts of positive and negative ions is provided. The ions thereby supplied are blown by an air supply 28 via an air supply path 28 toward the upper surface of the portion of the conveyor belt 13 from which the powder paint 30 has been drawn off, thereby making the belt clean enough for a color change each time the belt makes one round.

Details of the internal structure of the static eliminator 8 schematically illustrated in FIG. 4 are shown in FIG. 5. Small holes or a slit 27 are formed in a grounded electroconductive duct 25 which is disposed along the belt 13 perpendicularly to the plane of projection of FIG. 5. A multiplicity of electrode needles 26 are arranged in such a manner that they face the small holes or slit 27. The ac power source 9 applies a high ac voltage to the electrode needles 26 via a protective impedance (capacitor, in the case of the arrangement shown in FIG. 5) so that ac corona discharge takes place from the tips of the needles to the gap 27, thereby alternately generating large amounts of positive and negative ions. These ions are blown to the belt by the air supply as indicated by the arrow 28 so that static electricity accumulated on the belt is removed. The amount of static charge on the returning belt portion is thus made small enough for a color change each time the belt makes a round.

In this embodiment, the static eliminator 8 that is used after over-spray has been removed by the suction device 31. In stead, it may be disposed on the upstream side of the suction device 31 and used to eliminate static charge on the powder paint 30 collected on the belt 13 while simultaneously eliminating static charge on the belt 13.

The oversprayed paint powder recovering unit in accordance with this embodiment has a simple construction and is small in size and low-cost, and there is therefore no problem if this unit is replaced with a desired number of similar units which may be provided for different colors and each of which is capable of being detachably attached to the booth. This method optimizes the color changing operation in terms of reduction in the color changing time while maintaining a high efficiency of utilization of paint.

What is claimed is:

1. A powder coating booth comprising:
   a sidewall formed from an insulating material or a semiconductor;
   a ceiling having a function of downwardly supplying air;
   a bottom opened over a conveyor belt;
   means for forming an electric field extending to said conveyor;
   a suction device for drawing powder paint, said suction device being provided in said sidewall near said bottom; and
   a blowing-type static eliminator facing a portion of said conveyor belt positioned at a distance from said bottom.

2. A powder coating booth according to claim 1, wherein said sidewall formed from a semiconductor is grounded.

3. A powder coating booth according to claim 1, wherein said conveyor belt is formed from an electroconductive material and is grounded.

4. A powder coating booth according to claim 2, wherein said sidewall formed from a semiconductor is grounded.

5. A powder coating booth according to claim 2, wherein said conductive conveyor belt is grounded.

6. A powder coating booth according to claim 3, wherein said sidewall formed from a semiconductor is grounded.

7. A powder coating booth comprising:
   a sidewall formed from an insulating material or a semiconductor;
   a ceiling having a function of downwardly supplying air;
   a bottom formed by an upper surface of a portion of a conveyor belt, a grounding plate being superposed on the reverse surface of said portion of said belt;
   a suction device for drawing powder paint, said suction device being provided in said sidewall near said bottom;
   a paint powder drawing device; and
   a blowing-type static eliminator, said paint powder drawing device and said blowing-type static eliminator facing a portion of said conveyor belt positioned at a distance from said bottom.

8. A powder coating booth according to claim 5, wherein said sidewall formed from a semiconductor is grounded.

9. A powder coating booth according to claim 7, wherein said powder paint drawing device is disposed on the upstream side of said blowing-type static eliminator relative to the direction of the movement of said conveyor belt.

10. A powder coating booth according to claim 6, wherein said sidewall formed from a semiconductor is grounded.

11. A powder coating booth according to claim 7, wherein said powder paint drawing device is disposed on the downstream side of said blowing-type static eliminator relative to the direction of the movement of said conveyor belt.

12. A powder coating booth according to claim 7, wherein said sidewall formed from a semiconductor is grounded.

* * * * *

UNITED STATES PATENT AND TRADEMARK OFFICE
CERTIFICATE OF CORRECTION

PATENT NO. : 4,898,116

DATED : February 6, 1990

INVENTOR(S) : Katsutoshi Kozoe et al.

It is certified that error appears in the above-identified patent and that said Letters Patent is hereby corrected as shown below:

In the Abstract, line 12
      "mount" should be --amount--.
    Column 2, line 22:
      After "readily" delete --be--.
    Column 6, line 2:
      After "during" delete --of--.
    Column 6, line 51:
      "4 top 6" should be --4 to 6--.
    Column 7, line 33:
      "In stead" should be --Instead--.

Signed and Sealed this

Nineteenth Day of November, 1991

*Attest:*

HARRY F. MANBECK, JR.

*Attesting Officer*      *Commissioner of Patents and Trademarks*